(No Model.)
D. W. BOVEE.
TEDDER.
No. 352,605. Patented Nov. 16, 1886.
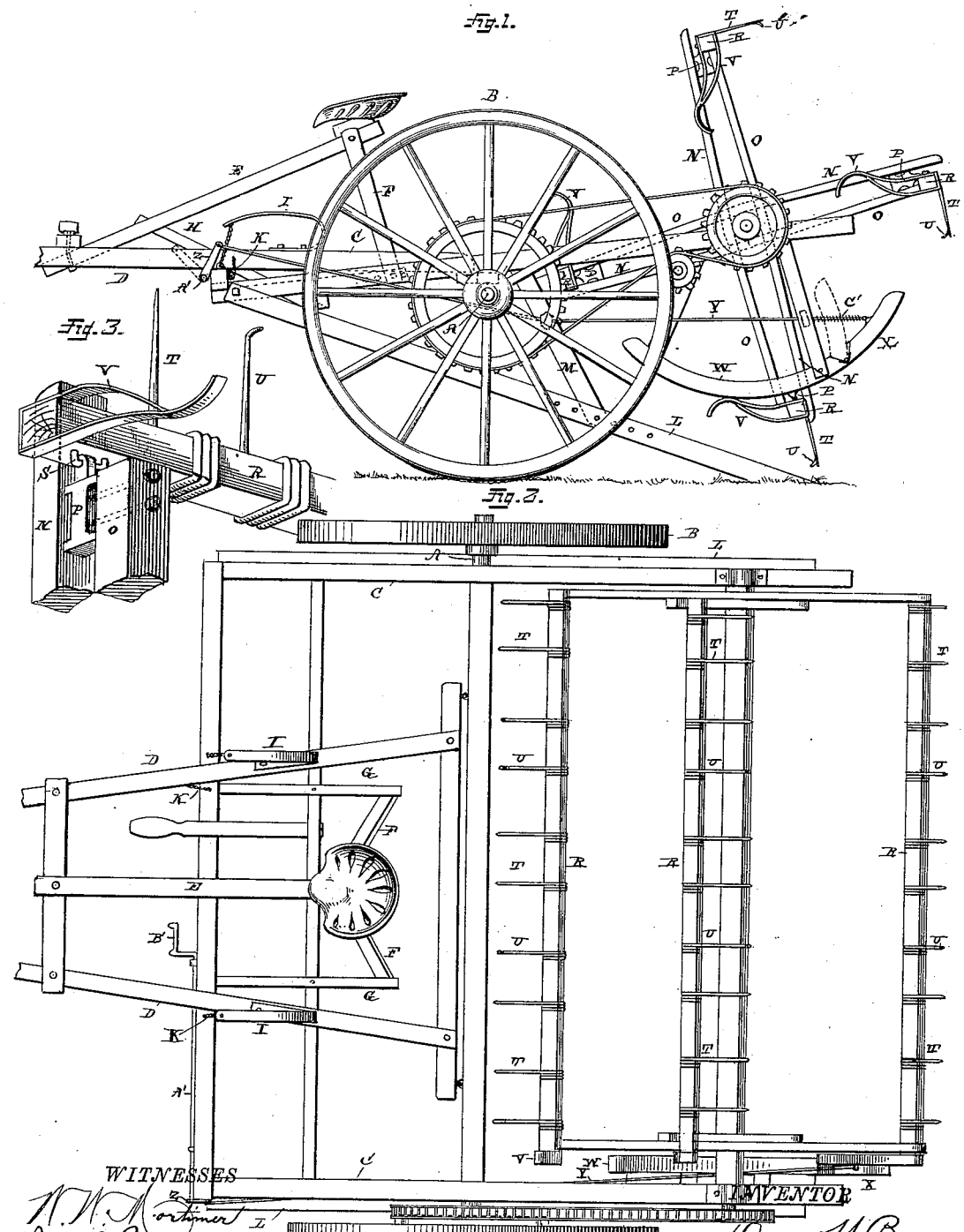

UNITED STATES PATENT OFFICE.

DAVID WILLIAM BOVEE, OF RICHLAND CENTRE, WISCONSIN.

TEDDER.

SPECIFICATION forming part of Letters Patent No. 352,605, dated November 16, 1886.

Application filed September 25, 1885. Serial No. 178,198. (No model.)

*To all whom it may concern:*

Be it known that I, DAVID WILLIAM BOVEE, of Richland Centre, in the county of Richland and State of Wisconsin, have invented certain new and useful Improvements in Tedders; and I do hereby declare the following to be a full, clear, and exact description of the invention, such as will enable others skilled in the art to which it pertains to make and use it, reference being had to the accompanying drawings, which form part of this specification.

My invention relates to an improvement in tedders; and it consists, in first, providing a machine for the purpose that shall be self-adjusting in all the operations for which it is adapted; second, providing a means whereby the weight of the driver will act to counterbalance the weight of the reel; third, providing a means for preventing unevenness of ground, causing the machine to yield thereto too quickly; fourth, providing a means for preventing unevenness of ground, causing the teeth on the reel to enter the same; fifth, providing a means for disengaging the hay from the teeth, and thus preventing the said hay from being carried over the reel; sixth, providing a means whereby the hay may be disengaged from the teeth with equal facility, whether the machine be traveling with or against the wind; and, seventh, in the construction and combination of parts, as specified hereinbelow, and particularly pointed out in the claims.

Figure 1 represents a side elevation of the tedder; Fig. 2, a plan view thereof; Fig. 3, a detail perspective of one of the tooth-bars and its connections viewed from the lower side.

The axle A is supported by the wheels B, and in turn supports the frame C of the machine. To the said axle, by means of eyebolts or similar devices, is pivotally connected the pole D, which is preferably V-shaped, as shown. To the pole is pivotally connected an inclined seat-supporting beam, E, held at its rear end by the standards F, passing between the arms of the pole, and adjustably connected to rearwardly-extending beams G of the main frame, the said beams G being provided with a series of bolt-holes for the purpose. The forward or rearward adjustment of the said standards F will carry the driver's weight forward or backward, thus causing his weight to act as a counterbalance-weight for the reel.

From the front of the frame projects upwardly between the arms of the tongue a foot lever or rest, H, by means of which the driver may depress the front of the frame, and thus elevate the rear or reel-bearing portion thereof for the purpose of transportation or carrying the same over obstructions.

On the arms of the tongue are supported steel spring arms I, which are bent forward and connected to the frame by means of chains or links. These springs tend to keep the reel to its work, and prevent a too sudden movement or shock because of the rear of the frame being elevated by obstructions or unevenness of ground. A short chain, K, attached to the pole and to the frame, acts as a stop, preventing a too great depression of the said frame.

Pivoted to each side of the front of the frame, and extending rearward and downward on an incline to a point about in a vertical line with the reel, are beams L, forming shoes for carrying the said reel over obstructions that may be met. Near the rear end the said beams are supported from the frame by the hangers M, which are pivoted to the said frame and secured to the said beam by a bolt passing through one of a series of holes therein, thus allowing a vertical adjustment of said shoe. The shoe, presenting an inclined surface to said obstruction, will be gradually raised by the same, and hence impart no shock to the machine. The reel is supported by proper bearings on or near the rear of the frame, and is revolved by sprocket-gearing connected to one of the wheels. Each pair of arms of the said reel consists of two pieces, N and O, the ends of one extending beyond those of the other, for the purpose hereinafter stated. Between the said ends are secured castings P, forming bearings for the lateral tooth-bars R, staples S on the same engaging in eyes on said castings. This manner of hanging said bars allows a quarter-revolution of the same, the sides thereof engaging, respectively, against the sides and the ends of the pieces N and O. The teeth T are secured to these bars by having the ends passed around the same, preferably three times, as shown. Two or more teeth, U, are placed on the bars, and have their outer ends turned in a direction contrary to that of the revolution of the said reel. These teeth will travel on the surface of the ground and prevent the other teeth from entering the same, and also act to raise the reel. At one end of each bar projects an arm, V, of such shape as to readily engage under a segmental frame, W, projecting from the under side of the main frame coincident with said reel. The arms, when resting under the frame W, prevent the teeth from turning, and hence cause them to carry the hay; but as soon as the said arms pass from under the said frame the arms from their own weight fall, and thus prevent its being carried over the reel. When it is desirable to carry the hay higher, as is the case except when the machine is traveling with the wind, a hinged construction of said segment, as shown at X, is used, and is held in position by a rod, Y, passing through eyes on the arms of the segment-frame W, and extending to the front of the main frame, where it is connected to the crank end Z of a rock-shaft, A', said shaft having a foot-rest, B', for operating the same. Surrounding the shaft between the construction of the segment and one of the arms thereof is a spring, C', which tends to normally keep it in the extended position; but it is quickly brought against the segment-frame and out of contact with the arms on the reel by the driver operating the shaft A'.

Having thus described my invention, I claim—

1. A tedder with a reel having tooth-bars pivoted therein, and each carrying an arm at one end, and a segment-frame on the reel-carrying frame, said segment-frame having a hinged connection at its rear end, and which is adapted to be raised upward, substantially as specified.

2. A tedder having a reel with arms formed of pieces, one projecting more than the other, and tooth-bars pivoted on one side to said arms between the same, and engaging with the end of one piece and the side of the other, substantially as specified.

3. In a tedder, a reel provided with the bars R, to each one of which is attached a set of teeth, T, and a set of teeth, U, bent near their outer ends in a direction opposite to the motion of the reel, substantially as specified.

4. A tedder with a reel having pivoted tooth-bars, and a segment-frame with a hinged extension, a rod extended from the same to the front of the main frame of the said tedder, and a rock-shaft connected to said rod and operating the same, substantially as specified.

In testimony whereof I affix my signature in presence of two witnesses.

DAVID WILLIAM BOVEE.

Witnesses:
B. LEWIS BLACKFORD,
WM. CRUIKSHANK.